Nov. 14, 1939.   J. H. GRIFFIN   2,179,740
GLASS GRINDING TOOL
Filed Sept. 2, 1938
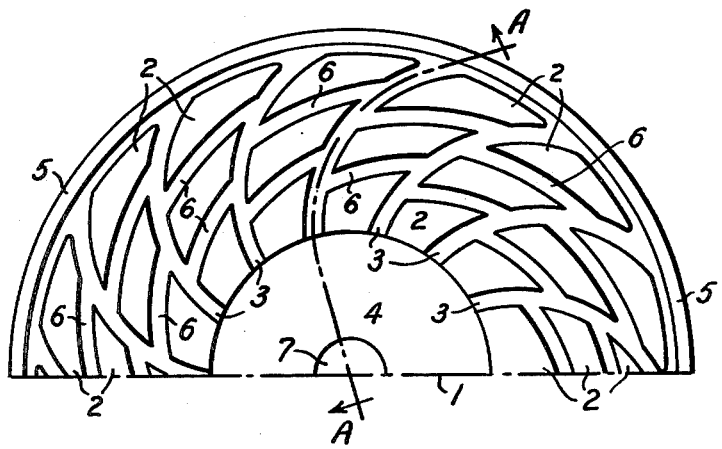
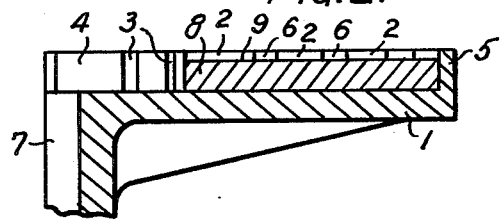
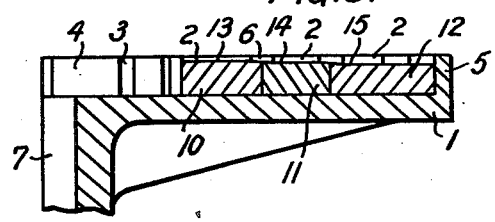
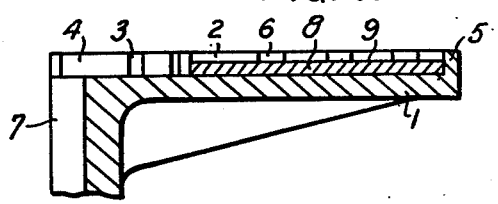
INVENTOR,
James Harris Griffin
By Morrison, Kennedy & Campbell,
Attorneys.

Patented Nov. 14, 1939

2,179,740

UNITED STATES PATENT OFFICE

2,179,740

GLASS GRINDING TOOL

James Harris Griffin, St. Helens, England, assignor to Pilkington Brothers Limited, Liverpool, England, a company registered under the Limited-Liability Acts Application September 2, 1938, Serial No. 228,103
In Great Britain October 5, 1937

4 Claims. (Cl. 51—209)

This invention relates to grinding tools employed on the under surface of glass in continuous grinding apparatus.

Grinding tools as customarily employed consist of a rotating disc to which are attached a plurality of blocks of cast iron termed nogs. These nogs, when new, are commonly from 8 to 10 cm. high and in operation, they wear down and remain serviceable until they are a few millimetres high.

Abrasive, generally sand in water, is fed to the centre of the tool and is distributed over the surface of the tool by centrifugal force, through channels between the nogs, these channels leading from the centre to the peripheral rim of the tool. Generally, the channels are inclined to the radius so as to prevent the abrasive from being thrown outwards too quickly, and without becoming caught between the glass and the operative surface of the nogs. Also these channels, called distributing channels, are generally intersected by other channels, called mixing channels, which may be circular or may be slightly inclined to circles co-axial with the tool. The distributing channels are sometimes continuous (apart from their intersections with the mixing channels) from centre to periphery, and are sometimes short channels between one mixing channel and the next outer mixing channel.

In the case of tools operating on the upper surface of glass, the abrasive is fed on to the glass at the centre of the tool, and travels outwardly on or close to the glass throughout all the channels, where it is caught by the operative surface of the nogs. In the case, however, of tools operating on the under surface of glass, the abrasive travels mostly on the bottoms of the channels, and does not reach the glass, except at the outer ends of the channels, where it becomes heaped up by centrifugal force. In consequence, the outer nogs effect most of the grinding, the inner nogs being insufficiently supplied with abrasive. The tool then wears into a conical convex form, by reason of the outer nogs wearing more rapidly than the inner nogs, and eventually causes the glass to break.

It is therefore essential that the abrasive should be distributed and supplied to the operative surface of the nogs, so that the effect of the grinding action is equal on all the nogs and causes them to wear at an equal rate.

According to the invention, the depth of the passages serving to distribute the abrasive is maintained small and substantially constant at any point, independently of the wear of the operative surface, by partially filling the channels with a material adapted to be eroded by the flow of abrasive along the passages between the material and the glass.

It has been found that if the channels are nearly filled with, for instance, plaster, leaving a depth of passage of only a few millimetres, the plaster is rapidly eroded by the flow of abrasive, so as to increase the depth of the passage. The rate of erosion diminishes as the depth of the passage increases, and becomes negligibly small when the depth reaches a certain amount, which was 2 cm. in the case of a tool on which applicant made experiments. A depth of passage of 2 cm. is, however, too great for effective distribution of the abrasive, but the depth at which erosion becomes negligibly small can be diminished by employing a material which has a greater resistance to erosion than plaster. Thus, a mixture of plaster with cement or with cement and sand has a greater resistance to erosion than plaster alone, and, by use of a mixture in suitable proportions, the depth of the passage at which erosion becomes negligible can be reduced to a few millimetres or less.

By this means it is possible to maintain the passages at a constant depth of any desired amount, during the whole life of the tool, that is to say, while the operative surface wears away to reduce the depth of the grooves in the metal from an initial amount of 8 to 10 cm. to a few millimetres, and this constant depth may be such that the abrasive is kept close to the surface of the glass, so that, at any point, a proportion is caught by the operative surface, while the remainder flows outwardly to effect the desired distribution.

In the case of tools employed by applicant with sand of medium grade, a depth of passage of about 2.5 mm. has been found to give a distribution of the abrasive which produces uniform wear of the tool. It is, however, impossible to specify generally the depth of passage which gives uniform wear or the proportions of plaster and cement, or plaster, cement and sand, which will maintain the passage at this constant depth, because the eroding action of the abrasive depends on its coarseness and its velocity, and on the inclination of the passages to the radius, and both the eroding action and the depth required for uniform wear depend on the radius at which the passage is. Further, in the case of certain tools and grades of sand it has been found of advantage to employ different mixtures for filling the grooves in annular portions of the tool at different radii.

In the accompanying drawing:

Figure 1 is a half plan view of a grinding tool, and

Figures 2, 3 and 4 are sections thereof along the line A—A of Figure 1, showing respectively different conditions of the tool.

The tool is formed of a disc 1 to which are fixed iron nogs 2, so that distributing channels 3 are formed passing from the central portion of the tool to its rim 5. Cross-channels 6 serving as mixing channels, connect the distributing channels 3 and, being inclined to circles concentric with the tool, serve also to some extent as distributing channels. Abrasive is supplied to the central space 4 through a central hole 7.

In Figure 2, a channel 3 is shown partially filled with a material 8 adapted to be eroded by the abrasive down to the depth below the operative surface indicated by the line 9. In Figure 3, the channel is shown filled with three different materials 10, 11 and 12, adapted to be eroded to depths indicated respectively by the lines 13, 14 and 15. Figure 4 shows the tool of Figure 2, after the nogs have worn away, the depth of the passage above the material 8 being the same, while the depth of the groove between the nogs has been largely diminished.

The material or materials employed in any particular case, for producing uniform wear, are best found by trial. Thus, if a tool is found to wear to a convex shape, the channels should be filled with a material more resistant to erosion, so that the passages are maintained at a lesser depth, thereby increasing the tendency of the abrasive to be caught between the operative surface and the glass and diminishing the flow of the abrasive to the outer portions of the tool; or, the passages nearer the centre of the tool may be filled with a material more resistant to erosion, or if it is found that the nogs in a particular annulus of the tool are wearing insufficiently, the channels between the nogs in this annulus may be filled with a material more resistant to erosion.

The depth of the passage is not always quite uniform in cross section, and the depth referred to above is the average depth.

The essential feature of the invention is that the distributing channels be filled as described, but the mixing channels may also be filled with the same or a more readily eroded material, especially when they are so inclined that they serve to some extent as distributing channels. At the outer ends of the channels, where the abrasive is heaped up by centrifugal force, it is not always necessary to fill up the channels.

Having described my invention, I declare that what I claim and desire to secure by Letters Patent is:

1. A rotary tool for grinding the under surface of traveling glass, comprising an annular iron body providing an operative surface, a centrally located recess, a passageway at the center of the tool through which abrasive is fed upwardly to said recess, and channels in the annularly operative surface defining self-supporting nogs, said channels communicating with said recess and remaining, at any point, at a constant depth below the operative surface sufficient to allow free flow of abrasive outwardly from the centrally located recess, the said channels consisting of grooves in the annular iron body partially filled with a material erodable by the outward flow of abrasive.

2. Rotary grinding tool as in claim 1, in which the erodable material is a mixture of plaster and cement.

3. A rotary grinding tool for grinding the under surface of traveling glass, comprising an annular iron body providing an operative surface, a centrally located recess, a passageway at the center of the tool through which abrasive is fed upwardly to said recess, and channels in the annularly operative surface defining self-supporting nogs, said channels communicating with said recess and remaining, at any point, at a constant depth below the operative surface sufficient to allow the free flow of abrasive outwardly from the center, said channels consisting of grooves in the annular iron body partially filled with a material erodable by the outward flow of abrasive, the erodable material in one annular portion of the tool having a different resistance to erosion from that in another annular portion.

4. Rotary grinding tool as in claim 3, in which the erodable materials are mixtures of plaster and cement.

JAMES HARRIS GRIFFIN.